No. 698,274. Patented Apr. 22, 1902.
E. R. GREENE.
ELECTRIC FLY TRAP.
(Application filed Aug. 29, 1901.)
(No Model.)
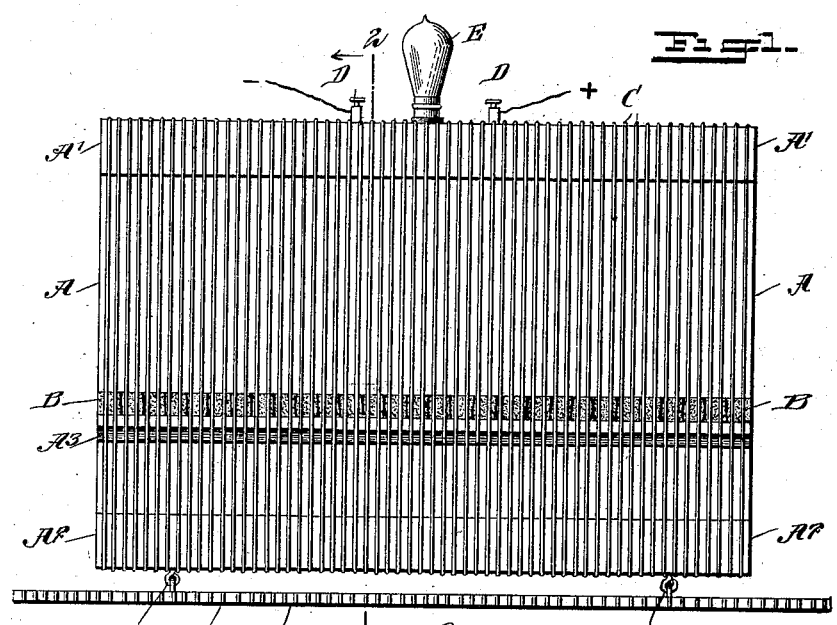
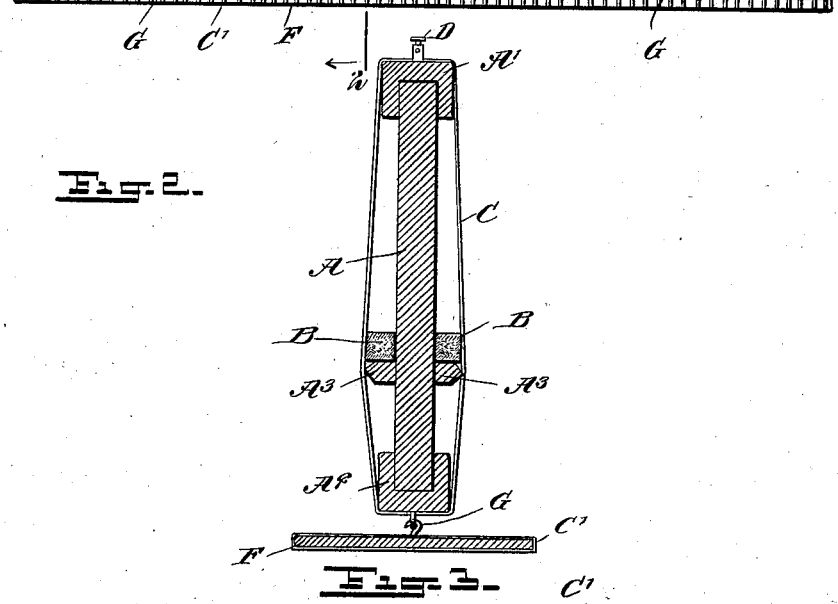
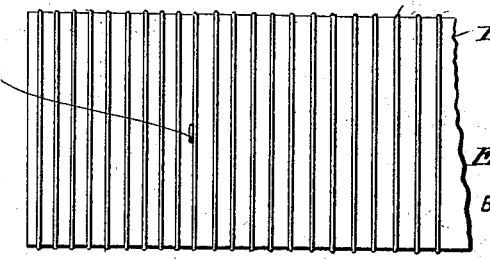
WITNESSES:
INVENTOR
Edwin R. Greene
BY
ATTORNEYS

UNITED STATES PATENT OFFICE.

EDWIN R. GREENE, OF PROVIDENCE, RHODE ISLAND.

ELECTRIC FLY-TRAP.

SPECIFICATION forming part of Letters Patent No. 698,274, dated April 22, 1902.

Application filed August 29, 1901. Serial No. 73,684. (No model.)

*To all whom it may concern:*

Be it known that I, EDWIN R. GREENE, a citizen of the United States, and a resident of Providence, in the county of Providence and State of Rhode Island, have invented a new and Improved Electric Fly-Killer, of which the following is a full, clear, and exact description.

The object of the invention is to provide a new and improved electric fly-killer, especially designed for use in stores, kitchens, dining-rooms, and other places and arranged to lure insects through the apparatus by suitable bait and to then pass an electric current through their bodies to instantly electrocute them.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a face view of the improvement. Fig. 2 is a transverse section of the same on the line 2 2 of Fig. 1, and Fig. 3 is a plan view of the shelf.

The improved fly-killer consists, essentially, of a frame made of insulating material, such as wood, hard rubber, or the like. The frame comprises a center plate A, top and bottom caps A' A², and intermediate strips A³, secured to the front and rear of the center plate A to form supports for the bait B, preferably in the shape of lump-sugar, as plainly indicated in Figs. 1 and 2. On the frame are wound sets of positive and negative wires C, the wires forming grids on both faces of the frame, as plainly indicated in Fig. 2, whereby insects flying on the grid alight at least on two adjacent wires, through which passes an electric current, so that the current also passes through the insect, and thereby electrocutes the same. The positive and negative wires are connected by binding-posts D and line-wires with a source of electric energy, and in the circuit is also arranged an electric incandescent lamp E, supported on the top of the frame in order to prevent the fuse-wires from burning out. The lamp when lighted also shows that the wires are in some way crossed or there is a metal connection somewhere, as the light should not burn when the fly-killer is in perfect working order, as there should always be an open circuit. The electrocuted insects drop onto a shelf F, suspended by suitable means G from the lower end of the cap A², and the said shelf F is wound with positive and negative wires C', electrically connected by the suspension means G with the wires C, so that the electric current passes through the said wires C'. Thus any insect alighting in the shelf is immediately electrocuted, and any insect dropping from the grids down onto the shelf and not quite dead is killed by the electric current passing through the wires C'.

The suspension means G are preferably in the form of hooks, of which one set is on the cap A² and the other set is on the shelf F, and the hooks on the shelf are preferably open, so as to allow of conveniently removing the shelf whenever it is desired to remove the dead insects from the shelf. After this has been done the shelf can be quickly returned to its position.

Having thus described my invention, I claim as new and desire to secure by Letters Patent—

1. An electric insect-killer, comprising a frame of insulating material and having a support for a bait, and positive and negative wires connected with a source of electric energy, and wound around the said frame to form grids on both the front and rear of the frame, the grids inclosing the bait, substantially as shown and described.

2. An electric insect-killer, comprising a frame of insulating material and having a support for a bait, positive and negative wires connected with a source of electric energy, and wound around the said frame to form grids on both the front and rear of the frame, the grids inclosing the bait, and a shelf suspended from the said frame and having positive and negative wires connected with the wires of the frame, as set forth.

3. An electric insect-killer, comprising a frame of insulating material and having a support for a bait, positive and negative wires connected with a source of electric energy, and wound around the said frame to form grids on both the front and rear of the frame, the grids inclosing the bait, a shelf, means for suspending it from the said frame, and positive and negative wires wound around said shelf and connected by the said suspension means with the wires of the said frame, as set forth.

4. An electric insect-killer, comprising a frame of insulating material and consisting of a center plate, top and bottom caps, strips intermediate of the said caps and extending along the front and rear of the center plate to form supports for a bait, and positive and negative wires connected with a source of electric energy, and wound around the said caps and stretched over said strips to form grids on both the front and rear of the frame, the grids inclosing the bait, substantially as shown and described.

In testimony whereof I have signed my name to this specification in the presence of two subscribing witnesses.

EDWIN R. GREENE.

Witnesses:
 CHAS. E. SHEAN,
 WALTER B. THOMPSON.